3,063,794
PREPARATION OF REFRACTORY OXIDE
CRYSTALS
Warren R. Grimes, Kingston, and James H. Shaffer and George M. Watson, Oak Ridge, Tenn., assignors to the United States of America as represented by the United States Atomic Energy Commission
No Drawing. Filed Aug. 29, 1960, Ser. No. 52,743
12 Claims. (Cl. 23—14.5)

Our invention relates to refractory oxides and more particularly to a method for the preparation of refractory oxide crystals.

Certain refractory oxides are extensively useful in the nuclear energy field. Uranium dioxide enriched in the fissionable uranium-235 isotope is employed as fuel in various types of heterogeneous nuclear reactors. Thorium oxide is utilized as fertile material in thermal breeder nuclear reactors, thorium being converted to fissionable uranium-233 as a result of neutron irradiation. Beryllium oxide is a useful moderating material especially suitable for high-temperature reactors. These oxides are also useful in combination, e.g., combined uranium dioxide-beryllium oxide would provide both fuel and moderator, and combined uranium dioxide-thorium oxide would provide both fuel and fertile material.

Numerous methods have been employed for the preparation of these oxides in various physical forms, the product oxide normally comprising agglomerates of large numbers of extremely small, submicron-size crystals. No convenient method has been available, however, for the preparation of these oxides in the form of particles comprising larger individual crystals. Individual crystal oxides offer certain advantages in nuclear reactor applications. For example, the release rate of fission product gases is decreased for high purity uranium dioxide fuel in the form of enlarged individual crystals. In addition, individual crystal uranium dioxide offers increased stability to oxidation and to uranium volatilization at high temperatures.

Refractory oxide individual crystals have been prepared previously by fusion techniques in which the oxide crystals are grown in a molten oxide medium. This method is impractical because of the extremely high melting points of these oxides. Individual crystals of $UO_2$ have also been prepared by growing $UO_3$ hydrate crystals in an autoclave and reducing these crystals to $UO_2$. In this method the $UO_2$ is obtained as composites of individual crystals 5 to 20 microns in size, with some platelets 5 by 30 microns. Larger individual crystals are desired both for $UO_2$ and other refractory oxides. Other characteristics desired in these oxides are high purity, high density and stoichiometric oxygen content.

It is, therefore, an object of our invention to provide a method of preparing refractory oxides in the form of individual crystals.

Another object is to provide a method of growing refractory oxide crystals.

Another object is to provide a method of preparing enlarged individual crystals of a refractory oxide selected from the group of uranium dioxide, thorium oxide and beryllium oxide.

Another object is to provide a method of preparing high-purity, stoichiometric uranium dioxide in the form of individual crystals.

Another object is to provide a method of preparing combined uranium dioxide-beryllium oxide.

Another object is to provide a method of preparing combined uranium dioxide-thorium oxide.

Other objects and advantages of our invention will be apparent from the following detailed description and claims appended hereto.

In accordance with our invention a refractory oxide selected from the group of uranium dioxide, beryllium oxide and thorium oxide may be prepared in the form of enlarged individual crystals by slowly contacting the surface of an agitated fused alkali metal halide melt containing metal values selected from the group of uranium, thorium and beryllium with a stream of an inert gas containing water vapor and separating the oxides formed thereby from the remaining melt. In another embodiment of our invention particles comprising a crystal of $UO_2$ coated with BeO are obtained by providing $UO_2$ crystals in a beryllium-containing melt and contacting the melt with a water-vapor bearing inert gas stream. Combined uranium-dioxide-thorium oxide crystals may also be obtained by employing a melt containing both uranium and thorium. The oxides obtained by this method exhibit high purity, high density and a near stoichiometric oxygen content. Individual oxide crystals up to 100 to 200 microns in size may be grown by this means.

We have found that a fused alkali metal halide melt may be employed as a medium for growing refractory oxide crystals. Uranium had previously been recovered from a fused fluoride melt in the form of $UO_2$ by contacting the melt with water vapor. In this procedure, however, the water vapor was bubbled through the melt to obtain a rapid reaction of the dissolved uranium with water vapor, this process being carried out solely to remove the uranium without regard to the form of the resulting $UO_2$. Under these conditions the $UO_2$ precipitates from the melt before appreciable crystal growth is obtained.

Although other alkali metal halide systems may be employed within the scope of our invention, it is preferred to use a melt comprising a low-melting mixture of the chlorides or fluorides of sodium and lithium. The composition of the starting melt may be varied to obtain a suitable reaction medium for the particular oxide desired. For the preparation of $UO_2$ a chloride system is preferred in order to facilitate separation of the product $UO_2$ by dissolution of the melt in water, NaCl and LiCl being more soluble in water than the corresponding fluorides. In the use of this system a mixture comprising 20 to 60 mole percent NaCl and the balance LiCl may be employed, with the lowest-melting mixture, i.e., approximately 25 mole percent NaCl, being preferred. A melt comprising 30 to 50 mole percent NaF and the balance LiF may also be employed for the preparation of $UO_2$, with a mixture comprising 40 percent NaF and 60 percent LiF being preferred. Uranium is provided in the starting melt in the form of $UF_4$. Although the concentration of $UF_4$ is not critical, 5 to 10 mole percent is preferred. The melt composition employed in the case of $UO_2$ may also be used for the preparation of thorium oxide, and the compositions preferred for $UO_2$ are likewise preferred for $ThO_2$. Thorium is supplied in the form of thorium fluoride, preferably at a concentration of 5 to 10 mole percent. For the preparation of beryllium oxide a lithium fluoride-beryllium fluoride melt is employed. Chlorides are unsuitable in the case of beryllium because of the volatility of beryllium chloride. It is preferred to employ a starting composition of 40 to 50 mole percent $BeF_2$ and the balance LiF. This system performs satisfactorily until the $BeF_2$ concentration is depleted to approximately 35 mole percent, at which point the melting point of the mixture becomes excessively high.

The refractory oxide crystals are formed upon contact of the melt with water vapor. In order to obtain crystal growth the reaction must be carried out slowly. A suitably slow reaction is obtained by introducing the water vapor in an inert gas stream at a controlled rate and by passing the gas stream over the surface of the melt, but not through the melt. Although any inert gas stream may be employed, helium is preferred. Water vapor is provided in the gas stream in a relative proportion up to saturation at room temperature. For an inert gas saturated at room temperature with water vapor the desired reaction is obtained by passing the gas over the melt at a rate within the range of 5 to 10 cubic centimeters per minute per square centimeter of melt surface. In order to obtain uniform crystal growth throughout the melt and to prevent the formation of needle-type crystals the melt is continuously agitated. Suitable agitation may be obtained by continuously bubbling a stream of an inert gas such as helium through the melt. The reaction may be continued for an extended period of time to obtain enlarged crystals up to 200 microns in size. Approximately 500 hours is required to obtain crystals 100 to 200 microns in size. At a size of approximately 200 microns the crystals tend to settle to the bottom of the melt and thus stop growing.

Although the temperature of the melt is not critical, it is preferred to employ a temperature within the range of 700° C. to 800° C. The minimum temperature is determined by the melting point of the particular composition, and any temperature above the melting point may be used. At temperatures over 800° C. corrosion to the reaction apparatus becomes severe.

Upon completion of the crystal-growing reaction the oxide crystals may be recovered by dissolving the salt constituents in an aqueous solution and separating the remaining solid oxides from the solution. Chloride constituents are readily dissolved in water. In the case of fluorides dissolution in an aqueous aluminum nitrate solution is preferred, the fluorides being complexed by the aluminum. The aluminum is then removed by washing the oxide with a nitric acid solution, and residual impurities are removed by washing with water.

In the combined $UO_2$—$BeO$ embodiment of our invention the $UO_2$ is first prepared in the form of single crystals up to 20 microns in size. These crystals are then disposed in a beryllium-containing melt, which is contacted with water vapor under the same conditions employed for the preparation of $UO_2$.

Combined $UO_2$—$BeO$ may be obtained in the form of single crystals of $UO_2$ coated on all sides with BeO by providing $UO_2$ single crystals in a beryllium-containing melt and contacting the melt with a water-vapor bearing stream. Although the coated crystals may be prepared in a single fluoride melt containing both beryllium and uranium, some of the $UO_2$ crystals grow beyond 20 microns and are not coated with BeO. It is accordingly preferred to prepare the $UO_2$ crystals separately in a uranium-containing chloride melt and then to dispose the $UO_2$ crystals in the beryllium-containing fluoride melt employed for the preparation of BeO. Suitable $UO_2$ crystals 5 to 20 microns in size may be obtained by conducting the reaction of the uranium-containing chloride melt with water vapor for a period of approximately 200 hours. BeO-coated crystals within the range of 50 to 200 microns in size may then be obtained by contacting the fluoride melt containing the $UO_2$ crystals and beryllium with water vapor for an extended period such as 500 hours. The reaction conditions and melt compositions described above for the preparation of $UO_2$ and BeO may likewise be employed in the preparation of the coated particles. Although the amount of $UO_2$ crystals to be added to the beryllium-containing fluoride melt is not critical, it is preferred to employ 1 to 5 weight percent $UO_2$ with respect to the BeO to be formed in the melt. If less $UO_2$ is used the BeO tends to form enlarged BeO crystals without a central $UO_2$ crystal, and at higher concentrations the $UO_2$ may be incompletely coated or remain in the pure state.

Crystals comprising combined $UO_2$—$ThO_2$ in the form of a solid solution may be obtained by contacting a melt containing both uranium and thorium with water vapor. The melt composition and other reaction conditions employed for the preparation of $UO_2$ may also be used for the $UO_2$—$ThO_2$ crystals. Although the combined oxide crystals may be prepared in any ratio of thorium to uranium in this method, crystals comprising a major proportion, e.g., 95 percent, $ThO_2$ are of primary interest in nuclear reactor applications. It is preferred to employ a total uranium plus thorium concentration of 5 to 10 mole percent in the starting melt.

Our invention is not limited to a particular apparatus, and any apparatus capable of providing the required reaction conditions may be employed. It is preferred to employ a metal cylinder provided with external heating means and lined with material resistant to the reactants. Means are provided at the top of the cylinder for continuous introduction and removal of the reactant stream over the surface of the melt. Means such as a dip leg are also provided for bubbling an inert gas stream through the melt to obtain agitation. The melt container may be lined with a resistant material such as nickel or graphite, depending on the oxide being prepared. Because of similarities in crystal structure BeO tends to adhere to graphite, and $UO_2$ and $ThO_2$ tend to adhere to nickel, thus lowering the product yield. It is accordingly preferred to use a nickel liner in the preparation of BeO and graphite in the use of $UO_2$ and $ThO_2$.

Our invention is further illustrated by the following specific examples.

*Example 1*

Uranium dioxide crystals were prepared by the following procedure. A fused halide melt was prepared by heating 5 pounds of a mixture comprising 40 weight percent sodium chloride and 60 weight percent lithium chloride to 800° C. and adding 300 grams of $UF_4$ to the mixture, which was disposed in a vertical nickel cylinder 4½ inches in diameter and 14 inches in height. The cylinder was provided at the top with an inlet and an outlet for continuous introduction and removal of the reactant gas stream over the surface of the melt. The cylinder was lined with a graphite liner 4 inches in diameter, and a graphite dip leg was provided at the bottom for introduction of helium gas. Helium gas saturated with water vapor was continuously swept across the surface of the melt at a rate of 500 cubic centimeters per minute. The melt was agitated by a stream of helium gas introduced through the dip leg. The temperature of the melt was maintained at 800° C. The progress of the reaction of $UF_4$ with water vapor was followed by monitoring the HCl content of the effluent gas stream in accordance with the following equations:

$$UF_4 + 2H_2O \rightarrow UO_2 + 4HF$$
$$HF + LiCl \rightarrow LiF + HCl$$

After 52 days the melt was allowed to cool and the vessel was opened. Hot water was then added to the melt to dissolve the salt mixture. After 3 days the salt was dissolved, leaving a $UO_2$ residue. The residue was then stirred for one hour in a one-liter beaker filled with a saturated aqueous solution of aluminum nitrate and was further washed 5 times with water. This treatment was then repeated and the resulting product was screened to remove material larger than 10 mesh. 206.7 grams of product were recovered by this means. The product was examined microscopically to determine crystal size. The $UO_2$ was in the form of dark red, isotropic crystals up to 200 microns in the longest dimension. The bulk of the crystals were 100 to 200 microns, with some being smaller. The product was then analyzed gravimetrically by oxidation to $U_3O_8$ at 900° C., an oxygen-to-uranium ratio of 2.002 being obtained. A further portion of the product was then subjected to X-ray study and petrographic examination which showed the product to be almost wholly of refractive index 2.36. X-ray powder analysis gave a unit cell constant of 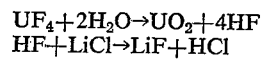 A., calculated from graphical extrapolation of 12 diffraction maxima. This value is indicative of an oxygen-touranium ratio very close to 2.000. Spectrochemical analysis gave the following impurities in weight percent.

| | | | |
|---|---|---|---|
| Al | $1.2 \times 10^{-3}$ | Li | $9.0 \times 10^{-3}$ |
| Ca | $7.0 \times 10^{-3}$ | Mg | $4.5 \times 10^{-4}$ |
| Cr | $2.6 \times 10^{-4}$ | Na | $3.5 \times 10^{-2}$ |
| Cu | $2.5 \times 10^{-3}$ | Ni | 0.16 |
| Fe | $1.6 \times 10^{-4}$ | Sr | $3 \times 10^{-4}$ |

Density of the product was then determined through the use of the water displacement method and a pycnometer. A value of 10.64 grams per cubic centimeter was obtained, the theoretical value for $UO_2$ being 10.97.

*Example II*

BeO-coated crystals were prepared by the following procedure. 50 grams of $UF_4$ was added to 300 grams of a fused mixture comprising 63 mole percent lithium fluoride and 37 mole percent beryllium fluoride. This mixture was disposed in a nickel cylinder 2 inches in diameter and 14 inches long, and helium saturated with water vapor at room temperature was passed over the melt at a temperature of 800° C. for 20 days. The product was recovered by dissolving the salt mixture and washing the residue with an ammonium oxalate solution and with water. Microscopic examination of the product revealed the presence of uncoated individual $UO_2$ crystals from 20 to over 100 microns in size of cubic shape and coated hexagonal particles comprising a crystal of $UO_2$, 10 to 20 microns in size coated with BeO crystals on all sides to give a total size of 50 to 200 microns. The latter crystals were observed petrographically to be strain free and free of inclusions, $UO_2$ excepted.

*Example III*

BeO crystals were prepared by the following procedure. A fused halide melt was prepared by heating 5 pounds of a mixture comprising 70 weight percent $BeF_2$ and 30 weight percent LiF to 800° C. This melt was disposed in the apparatus of Example I except that the dip leg was comprised of nickel rather than graphite. A stream of helium saturated with water vapor at room temperature was introduced across the surface of the melt at a rate of 500 cubic centimeters per minute. The temperature of the melt was maintained at 800° C. The melt was continuously agitated by bubbling a stream of helium through the dip leg. The progress of the reaction was followed by monitoring the HF content of the effluent gas in accordance with the following equation:

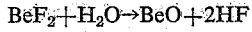

$$BeF_2 + H_2O \rightarrow BeO + 2HF$$

After 45 days' reaction time the melt was cooled and removed from the vessel. The melt was then broken into small pieces and contacted with distilled water in plastic containers for one week. Undissolved LiF was removed by mixing the residue with a saturated aqueous solution of aluminum nitrate. The residue was then washed with concentrated nitric acid to remove structural metals and aluminum, filtered and dried. The product was analyzed spectrographically, with the following impurities being found, in parts per million by weight:

| | | | |
|---|---|---|---|
| Al | <10 | Li | 100 |
| B | <5 | Mg | 15 |
| Ba | <5 | Mn | ~10 |
| Bi | <5 | Na | <10 |
| Co | <5 | Ni | 20 |
| Cr | 20 | Pb | <5 |
| Cu | 10 | Si | 45 |
| Fe | <20 | Sn | <5 |
| Ca | None | V | 10 |
| K | <20 | Zn | <25 |

Microscopic examination of the product revealed the presence of single crystals up to 50 microns in size.

*Example IV*

Thorium oxide crystals were prepared by the following procedure: 100 grams of $ThF_4$ was added to 500 grams of a fused mixture comprising 40 percent sodium fluoride and 60 percent lithium fluoride. The mixture was disposed in a cylinder 2 inches in diameter and 14 inches long. The cylinder was provided with a 1½ inch diameter nickel liner. The melt was agitated mechanically by means of a nickel rod with an attached wire screen dasher. A stream of helium saturated with water vapor at room temperature was passed over the surface of the melt at a rate of 200 cubic centimeters per minute. The reaction was carried out for 20 days at a melt temperature of 800° C. The melt was then cooled and washed with hot water and an aqueous ammonium oxalate solution. Petrographic examination of the product thus obtained revealed the presence of thorium oxide single crystals without inclusions. The crystals were colorless, isotropic and up to 120 microns in size.

*Example V*

Combined $ThO_2$—$UO_2$ crystals were prepared by the following procedure: A mixture comprising 175 grams each of $UF_4$ and $ThF_4$ and 1400 grams of a mixture comprising 40 mole percent sodium chloride and 60 mole percent lithium fluoride was heated to 800° C. in the apparatus of Example I. The melt was agitated by a bubbling stream of helium and was contacted with a stream of helium saturated at room temperature with water vapor at a rate of 500 cubic centimeters per minute for a period of 49 days. The melt was then cooled and washed with water and a saturated aqueous aluminum nitrate solution. Petrographic examination of the resulting product showed the product to be comprised of individual crystals of combined $UO_2$—$ThO_2$ in the form of solid solutions, with varying $UO_2$ and $ThO_2$ concentrations. The crystals were up to 240 microns in size, and averaged 40 microns.

The above examples are illustrative only and are not to be construed as limiting the scope of our invention, which is limited only as indicated in the appended claims. It is also to be understood that other refractory oxides such as magnesium oxide and zirconium oxide may also be obtained in the form of enlarged single crystals by reacting a metal halide with water vapor in a fused salt medium.

Having thus described our invention, we claim:

1. The method of preparing $UO_2$ in the form of individual crystals which comprises contacting only the surface of an agitated fused melt comprising a mixture of salts selected from the group consisting of a mixture of LiCl, NaCl, and $UF_4$ and a mixture of LiF, NaF, and $UF_4$ with a water-vapor bearing inert gas stream at a rate within the range of approximately 5 to 10 cubic centimeters per minute per square centimeter of melt surface and separating the $UO_2$ formed thereby from the remaining melt.

2. The method of preparing $UO_2$ in the form of individual crystals which comprises contacting only the surface of an agitated fused melt comprising a mixture of salts selected from the group consisting of a mixture of 20 to 60 mole percent NaCl, 5 to 10 mole percent $UF_4$, and the balance LiCl and a mixture comprising 30 to 50 mole percent NaF, 5 to 10 mole percent uranium tetrafluoride and the balance lithium fluoride with a water-vapor bearing inert gas stream at a rate within the range of approximately 5 to 10 cubic centimeters per minute per square centimeter of melt surface and separating the $UO_2$ formed thereby from the remaining melt.

3. The method of preparing highly pure, stoichiometric $UO_2$ in the form of single crystals 100 to 200 microns in diameter which comprises continuously contacting only the surface of a melt comprising 20 to 30 mole percent sodium chloride, 5 to 10 mole percent uranium tetrafluoride and the balance lithium chloride with a stream of an inert gas saturated with water vapor at room temperature at a rate within the range of 5 to 10 cubic centimeters per minute per square centimeter of melt surface for a period of at least 500 hours, continuously bubbling a stream of an inert gas through said melt and separating the $UO_2$ formed thereby from the remaining melt.

4. The method of preparing BeO in the form of individual crystals which comprises contacting only the surface of an agitated fused mixture of lithium fluoride and beryllium fluoride with a water-vapor bearing inert gas at a rate within the range of approximately 5 to 10 cubic centimeters per minute per square centimeter of surface of said mixture and separating the BeO formed thereby from the remaining melt.

5. The method of preparing BeO in the form of individual crystals which comprises contacting only the surface of an agitated melt comprising 35 to 50 mole percent beryllium fluoride and the balance lithium fluoride with an inert gas stream saturated at room temperature with water vapor at a rate within the range of 5 to 10 cubic centimeters per minute per square centimeter of melt surface and separating the BeO formed thereby from the remaining melt.

6. The method of preparing $ThO_2$ in the form of individual crystals which comprises contacting only the surface of an agitated melt comprising a mixture selected from the group consisting of a mixture of 20 to 60 mole percent NaCl, 5 to 10 mole percent $ThF_4$ and the balance LiCl and a mixture comprising 30 to 50 mole percent NaF, 5 to 10 mole percent $UF_4$ and the balance LiF with a water-vapor bearing inert gas stream at a rate within the range of approximately 5 to 10 cubic centimeters per minute per square centimeter of melt surface and separating the $ThO_2$ formed thereby from the remaining melt.

7. The method of preparing individual crystals of combined $UO_2$—$ThO_2$ which comprises contacting only the surface of an agitated fused melt comprising a fused mixture selected from the group consisting of a mixture of 5 to 10 mole percent $ThF_4$ and $UF_4$, 20 to 60 mole percent NaCl and the balance LiCl and a mixture of 5 to 10 mole percent $ThF_4$ and $UF_4$, 30 to 50 mole percent NaF and the balance LiF with a water-vapor bearing inert gas stream at a rate within the range of approximately 5 to 10 cubic centimeters per minute per square centimeter of melt surface and separating the crystals formed thereby from the remaining melt.

8. The method of preparing particles comprising a single crystal of $UO_2$ coated with BeO which comprises contacting only the surface of an agitated fused melt comprising 35 to 50 mole percent $BeF_2$ and the balance LiF, said melt containing $UO_2$ single crystals 5 to 20 microns in size, with a water-vapor bearing inert gas stream at a rate within the range of approximately 5 to 10 cubic centimeters per minute per square centimeter of melt surface for a period of at least 500 hours and separating the resulting coated particles from the remaining melt.

9. The method of claim 8 in which the ratio of said $UO_2$ to the BeO formed in said melt is approximately one to five weight percent.

10. The method of preparing BeO-coated $UO_2$ crystals which comprises contacting only the surface of an agitated fused melt comprising 30 to 50 mole percent $BeF_2$, $UF_4$ in a proportion of one to five weight percent of said $BeF_2$, and the balance LiF with a water-vapor bearing inert gas stream at a rate within the range of approximately 5 to 10 cubic centimeters per minute per square centimeter of melt surface and separating the crystals formed thereby from the remaining melt.

11. The method of preparing individual crystals of an oxide selected from the group consisting of $UO_2$, $ThO_2$ and BeO which comprises contacting only the surface of an agitated fused alkali metal halide melt containing metal values selected from the group consisting of uranium, thorium and beryllium with a water-vapor bearing inert gas stream at a rate within the range of approximately 5 to 10 cubic centimeters per minute per square centimeter of melt surface area and separating the resulting crystals from the remaining melt.

12. The method of preparing individual crystals 100 to 200 microns in size of an oxide selected from the group consisting of $UO_2$, $ThO_2$ and BeO which comprises contacting only the surface of an agitated fused alkali metal halide melt containing metal values selected from the group consisting of uranium, thorium and beryllium with an inert gas stream saturated with water vapor at room temperature at a rate within the range of 5 to 10 cubic centimeters per minute per square centimeter of melt surface area for a period of at least approximately 500 hours and separating the resulting crystals from the remaining melt.

References Cited in the file of this patent

UNITED STATES PATENTS 1,721,485     Kersten _____ July 16, 1929

OTHER REFERENCES

AEC Document ORNL 2474, pp. 97–101, May 14, 1958.

AEC Document CF–59–2–61, pp. 14, 15, April 1, 1959.

Katz et al.: "Chemistry of Uranium," pp. 372–374, 440, 485, 505, 570, 571, McGraw-Hill Book Co., Inc., 1951.